J. BRIGGS.
Preparing Starch.

No. 56,356. Patented July 17, 1866.

Witnesses:
J B Ridder
M W Frothingham

Inventor:
John Briggs
By his Attys.
Crosby & Gould

UNITED STATES PATENT OFFICE.

JOHN BRIGGS, OF ROXBURY, MASSACHUSETTS.

IMPROVED APPARATUS FOR PREPARING STARCH, SIZE, &c.

Specification forming part of Letters Patent No. 56,356, dated July 17, 1866.

*To all whom it may concern:*

Be it known that I, JOHN BRIGGS, of Roxbury, in the county of Norfolk and State of Massachusetts, have invented certain new and useful Improvements in Apparatus for Preparing Size, Starch, Paste, Glue, &c.; and I do hereby declare that the following, taken in connection with the drawings which accompany and form part of this specification, is a description of my invention sufficient to enable those skilled in the art to practice it.

This apparatus is designed for use in the transformation of large amounts of flour, starch, &c., into paste or sizing, &c., for use by manufacturing establishments, paper-hangers, and others.

Figure 1:
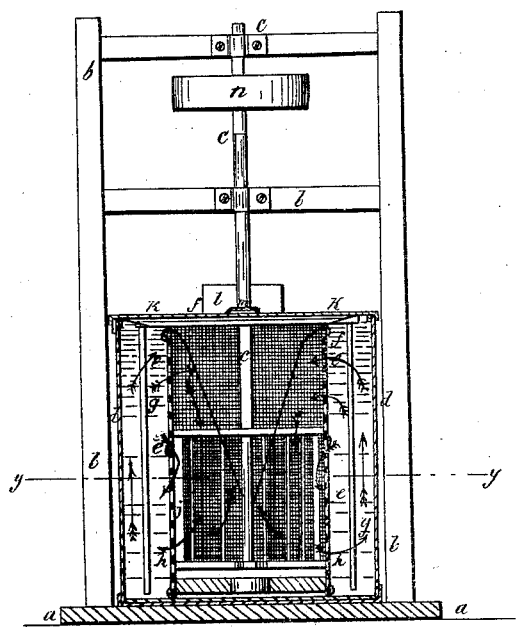
Figure 3:
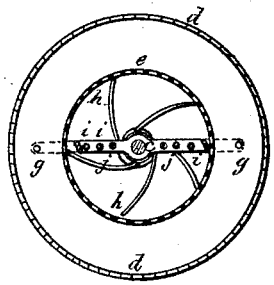
Figure 2:
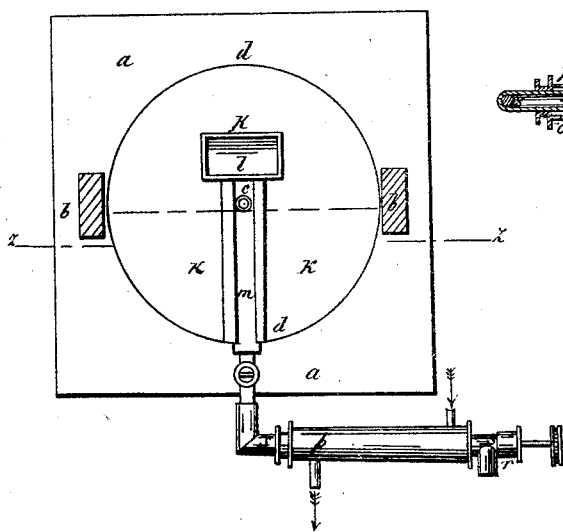
Figure 4:
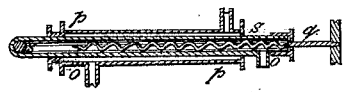

Of the drawings, Figure 1 denotes a vertical longitudinal section of an apparatus embodying my invention, the section being taken on the line $z\ z$, (seen in Fig. 2, which is a plan of the apparatus below the shaft-sustaining part of the frame-work.) Fig. 3 is a sectional view taken on the line $y\ y$, and Fig. 4 is a central section taken through the heater.

The construction of my apparatus is as follows: On the base $a$, which supports the frame-work $b$, on which the shaft $c$ is mounted, a tank, $d$, is placed, and within it is located the foraminous cylinder $e$. On the shaft $c$ is fixed a cross-piece, $f$, which carries the stirrers $g$, these rotating in the annular space between $d$ and $e$. The cylinder $e$ has a solid base provided with a step for shaft $c$, and on said shaft is secured a hub and arms, $h$, so as to rotate quite close to the base of the cylinder $e$, and a cross-piece, $i$, to which are secured stirrers $j$. The tank $d$ is provided with a cover, $k$, on which is a hopper, $l$, through which material can be supplied to the cylinder $e$.

For convenience in getting at the interior of this apparatus for cleansing and repairs, the cover $k$ is slotted so that it can be removed from the shaft $c$, the slot in the cover being closed by a slide, $m$.

The operation of the apparatus in making paste, &c., so far as mixing is concerned, is as follows: The shaft $c$ being put in rotation by the belt-wheel $n$, and the quantity of water admitted, the proper quantity of flour to mix with the water is gradually let fall through the hopper $l$ into the cylinder $e$. The stirrers $j$ and the arms $h$ act to break up the lumps of flour and mix them thoroughly with the water, while the whole mass assumes, from centrifugal force imparted by the action of the stirrers, the form shown in Fig. 1 in blue lines, and circulating in the direction shown by the arrows, passing through the foraminous cylinder $e$, from the sides of the tank toward the shaft, and from the shaft toward the sides of the tank, the passage of the fluid or semi-fluid mass through the holes or meshes of the cylinder $e$ still further mixing the solid and the liquid matter into one homogeneous compound.

To complete the manufacture of the paste by cooking, it is allowed to pass from the tank $d$ into a pipe, $s$, which is surrounded by a steam-jacket, $p$, for the purpose of heating the pipe $s$ and its contents. This pipe $s$ is fitted with a screw, $o$, which extends within and along the length of the pipe, where it is surrounded with the jacket, and by its rotation, effected by the belt-wheel $q$, causes the paste to move along the pipe, which is constantly kept scraped by contact of the edges of the threads of the screw, which discharges the paste in a thoroughly mixed and cooked condition at the outlet $r$.

As in some cases it may be desirable to have the quantity of paste or other material pass at a uniform rate of speed through the cooking-tube $s$, and as the head or height of the fluid or semi-fluid mass in the tank is constantly lessened by its discharge, it may be advisable to introduce between the tank $d$ and the heated pipe $s$ a low open vessel, into which the contents of the tank $d$ may be discharged, and from which the heated pipe may be supplied by the action of the screw therein, the flow from the tank $d$ into such intermediate vessel being regulated by a valve or cock operated by a float resting on the fluid in said vessel and keeping it at a uniform height. The head or pressure on the pipe $s$ being thus made constant, the rate at which the paste will be moved through the cooking-pipe will be uniform.

I claim—

1. In combination with stirrers, the tank $d$ and foraminous cylinder $e$, all operating together for the purpose set forth.

2. The steam-jacketed pipe $s$, when provided with the screw $o$, and arranged to operate substantially as described.

JOHN BRIGGS.

Witnesses:
    J. B. CROSBY,
    F. GOULD.